(12) United States Patent
Kyrtsos

(10) Patent No.: US 6,388,406 B1
(45) Date of Patent: May 14, 2002

(54) METHOD AND SYSTEM FOR DETECTING AN OBJECT IN THE PATH OF A VEHICLE POWER WINDOW SYSTEM USING ACOUSTIC SIGNALS

(75) Inventor: Christos Kyrtsos, Southfield, MI (US)

(73) Assignee: Maritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/364,394

(22) Filed: Jul. 30, 1999

(51) Int. Cl.[7] .............................. G05B 9/02; E05F 15/16
(52) U.S. Cl. ........................ 318/286; 318/468; 701/49
(58) Field of Search .................................. 318/264, 265, 318/266, 286, 466, 468, 469; 701/49; 49/25–31

(56) References Cited

U.S. PATENT DOCUMENTS 5,410,227 A * 4/1995 Toyozumi et al. .......... 318/283
6,084,316 A * 7/2000 Willmann .................. 307/10.1
6,088,641 A * 7/2000 Bushmann et al. ........... 701/49

FOREIGN PATENT DOCUMENTS

DE 4321028 A * 6/1993
EP 0560047 A1 * 2/1993

* cited by examiner

Primary Examiner—Bentsu Ro
(74) Attorney, Agent, or Firm—Carlson, Gaskey & Olds

(57) ABSTRACT

A method and device for detecting an object caught in the path of a vehicle power window system includes an acoustic sensor for sensing acoustic signals associated with the window as the window closes. A control circuit having control logic compares the sensed acoustic signals with a predetermined noise threshold. If a difference is determined between the sensed signals and the predetermined noise threshold, an object caught in the path of the vehicle power window system is assumed to be present and the control circuit controls the motor accordingly to either stop or reverse direction.

12 Claims, 2 Drawing Sheets

METHOD AND SYSTEM FOR DETECTING AN OBJECT IN THE PATH OF A VEHICLE POWER WINDOW SYSTEM USING ACOUSTIC SIGNALS

BACKGROUND OF THE INVENTION

This invention relates to methods and systems for detecting an object in the path of a vehicle power window system utilizing acoustic signals.

Many vehicles today have electronically controlled windows and may even have electronically controlled sun/moon roofs. These systems provide the operator with ease in opening and closing the windows. However, if the operator is distracted while closing the window, it is possible for an object, such as an arm, hand or finger, to be caught between the window and the header, or seal, of the automotive window.

Techniques exist today to measure various characteristics of a motor associated with a power window system, such as motor current or torque, to assume an obstruction is in the way of the vehicle window. However, aging effects and/or external variables, such as temperature, friction from the seals, voltage levels, etc., result in these techniques being unreliable and unpredictable.

Thus, there exists a need for a reliable, yet inexpensive method and system for detecting an object caught in the path of a power window system.

SUMMARY OF THE INVENTION

An object caught in the path of a power window system is detected by sensing acoustic signals associated with the window as the window closes. The sensed acoustic signals are compared with a predetermined noise threshold, which can be either a predetermined reflected acoustic pattern associated with a predetermined reference acoustic signal or a previously sensed acoustic signal.

If a difference is detected, an object is assumed to be present in the path of the window. A control circuit acts accordingly to either stop or reverse direction of the motor closing the window.

These and other features of the present invention can be understood from the following specification and drawings.

DETAILED DESCRIPTION OF A PREFERRED EMBODIMENT

Figure 1:
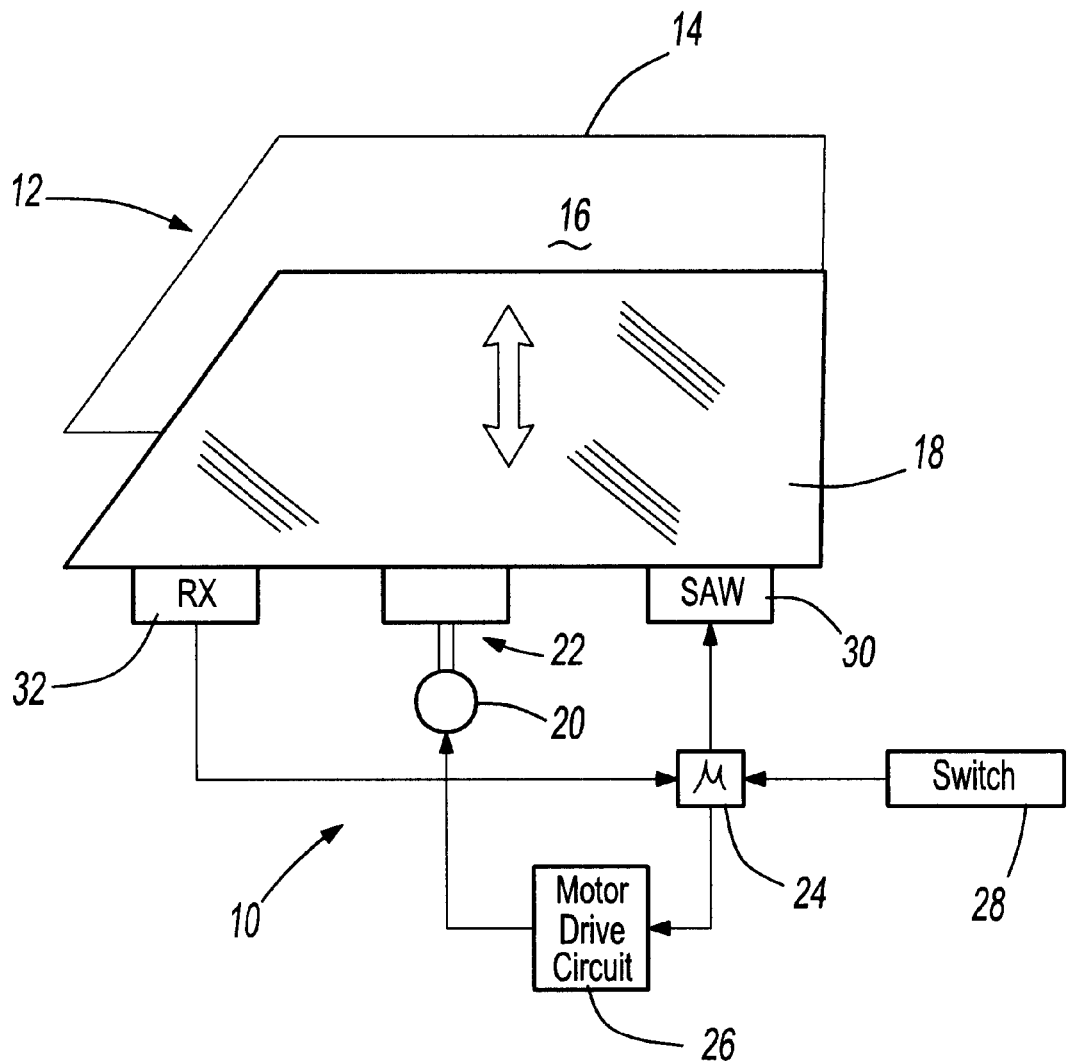
FIG. 1 is a schematic block diagram of a power window system incorporating the method and system of the present invention.

FIG. 1 shows a power window system 10 incorporating the present invention. An automotive vehicle has a door 12 and a window frame 14 defining a window opening 16. While a side window is shown, the term "window" as used in this application also extends to rear windows, moon roofs, sun roofs or other vehicle closure components.

The door 12 is equipped with a window glass 18 movable elevationally within the window opening 16 and a drive motor 20 linked with a regulator 22, shown schematically, for driving the window glass 18 upward and downward. Microprocessor, or control circuit, 24 controls the drive motor 20 via motor drive circuit 26 in response to signals from switch 28 that commands upward/downward movement of the window glass 18.

The system 10 further includes a surface acoustic wave (SAW) generator 30 mounted onto the glass 18, either on the bottom underside of the glass 18 or on the surface of the glass 18 near the bottom. SAW generator 30 transmits a reference acoustic wave on/in the glass 18 for reflection by either the frame 14 or an object (not shown). SAW generator 30 may be any conventional resonator/oscillator that transmits an acoustic signal at a predetermined relatively low frequency, such as 40–50 kHz. SAW generator 30 may be self-generating or controllable by control circuit 24, in which case SAW generator 30 is coupled to control circuit 24.

The reflected acoustic signal transmitted by SAW generator 30 is sensed by acoustic sensor 32, which is in communication with control circuit 24. In the absence of objects caught between the window glass 18 and the frame 14, an empirically determined reflected acoustic signal pattern should be sensed by acoustic sensor 32 as the window 18 closes. If this known pattern is not sensed by sensor 30, control circuit 24 identifies an object to be in the path of the window 18 and the frame 14 and acts accordingly by either stopping the motor 20 or reversing its direction. Thus, an object can be detected and the motor 20 controlled accordingly prior to the object actually causing a resistive torque to be applied to the motor 20. Once the window has closed completely, the reference signal is no longer generated and the method stops.

Alternatively, rather than listening for a predetermined reflected acoustic pattern, the system 10 may just listen/sense any extraneous noises produced by an object touching the docket glass 18. That is, as the window 18 is initially closing, acoustic sensor 32 senses all sounds from the glass 18, which should be consistent in the absence of an object. However, if an object is present, sound, or noise, different from the initial sound sensed would be detected by sensor 32. Control circuit 24 can then act accordingly to stop or reverse the direction of the motor 20. The two approaches can also be used in combination.

In the alternative embodiment, since there is no reference signal being generated during actual closing of the window, reflected acoustic signals are continuously sensed, even once the window is closed. However, there may be instances in which the window closes successfully without an object being detected or caught therebetween, yet an occupant of the vehicle may tap the window 18 with his/her finger or with an object, either accidentally or intentionally. In this instance it may be necessary to limit the period of time for sensing the acoustic signals after successful closing of the window 18 so that the window 18 is not commanded by control circuit 24 to open based upon a false indication of an object being caught between the window 18 and the frame 14.

Figure 2:
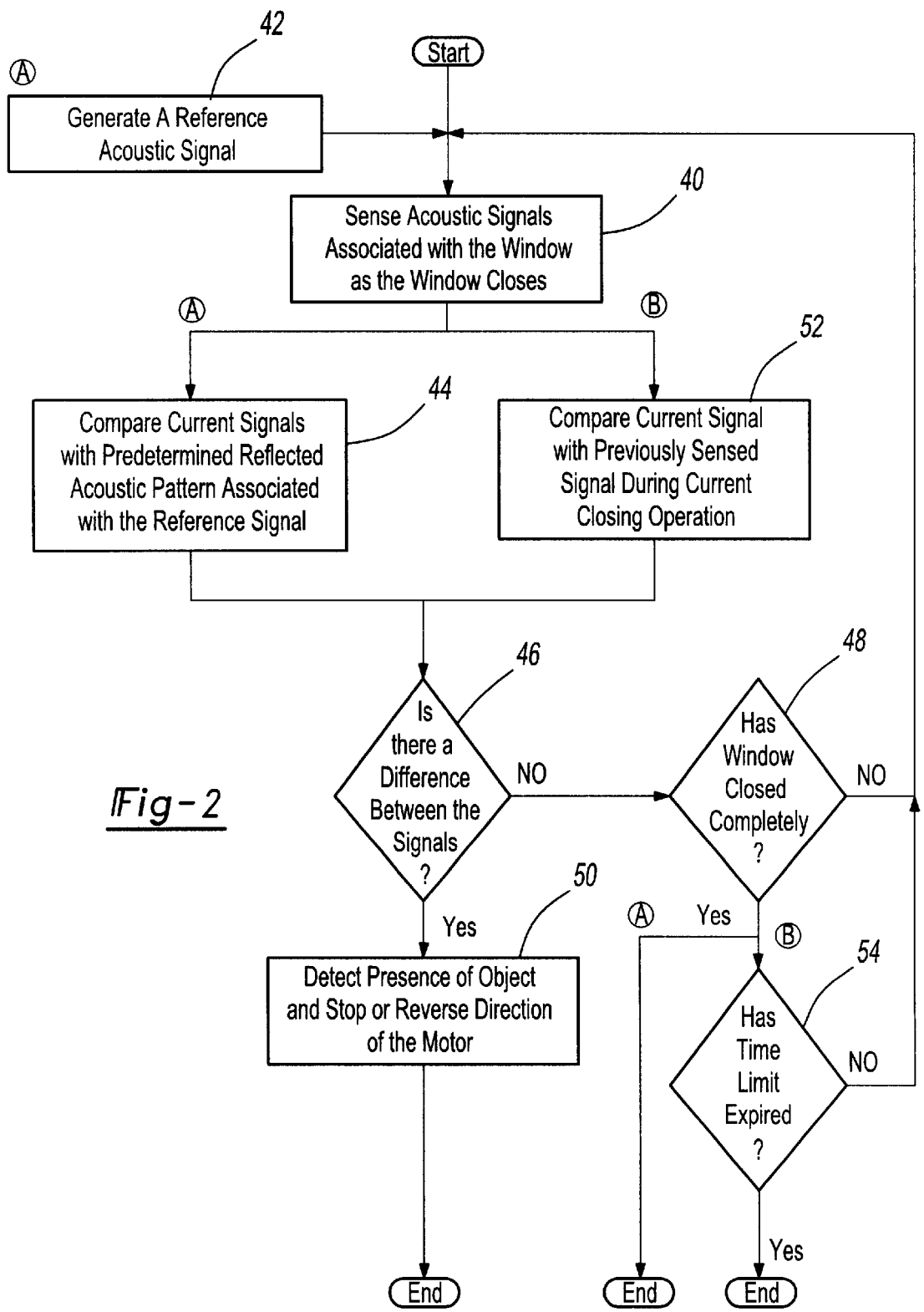
FIG. 2 is a flow diagram illustrating the general steps associated with the method of the present invention.

Turning now to FIG. 2, a flow diagram is shown illustrating the general steps associated with the method of the present invention. The method begins with the step of sensing acoustic signals associated with the window 18 as the window 18 closes, as shown at block 40. Next, a comparison is made between the sensed acoustic signals and some predetermined threshold. This can be accomplished in one of two ways, as illustrated by A and B in FIG. 2.

In the A embodiment, a reference acoustic signal is generated across the surface of the window, as shown at block 42. According to empirical evaluation, the reference signal should be reflected in a predetermined manner as the window closes provided an object is not in the path of the closing window. Thus, the sensed acoustic signals are compared with a predetermined reflected acoustic pattern associated with the reference signal, as shown at block 44.

If there is no difference between these signals, as shown at conditional block 46, then an object is not in the path of the window and the method proceeds to continue comparing the signals until the window has closed completely, as shown at conditional block 48. However, if there is a difference between these two signals, an object is assumed to be present and the motor is controlled to either stop or reverse its direction, as shown at block 50. Of course, at some point the window is "full up" and contacting its seal. This position is programmed into the control to eliminate false hits.

In the alternative B embodiment, the sensed signals are compared to previously sensed signals during the same window closing operation to determine if there is a deviation, or difference, indicative of a foreign object in the path of the window 18, as shown at blocks 52, 46, and 50.

If there is no difference between the currently sensed acoustic signal and the previously sensed acoustic signal, a determination is made as to whether the window has closed completely, as shown at conditional block 48. If window has not yet closed, the method proceeds to continue comparing the currently sensed acoustic signal with the previously sensed acoustic signal. If the window has closed completely, however, a determination is made as to whether or not a predetermined time period has expired, as shown at conditional block 54. If not, a comparison between the current and previously sensed signals continues. If the time limit has expired, however, the method ends in response to a successful closing of the window.

Preferred embodiments have been disclosed. However, a worker skilled in this art would recognize that modifications would come within the scope of this invention. Thus, the following claims should be studied to determine the scope and content of this invention.

What is claimed is:

1. A system for detecting an object caught in the path of a vehicle power window system having a window that opens and closes via a motor commanded by a control circuit, the system comprising:

an acoustic sensor for sensing acoustic signals associated with the window as the window closes;

a control circuit having control logic for comparing the sensed acoustic signal with a predetermined noise threshold and detecting an object caught in the path of the vehicle power window system based on the comparison; and wherein the acoustic sensor is further operative to sense a current acoustic signal as the window closes during a current window closing operation indicative of the sound associated with the window closing, and wherein the control circuit, in comparing, is further operative to compare the sensed current acoustic signal with a previously sensed acoustic signal during the current window closing operation and determine if the sensed current acoustic signal differs from the previously sensed acoustic signal.

2. The system as recited in claim 1 further comprising:

a surface acoustic generator for generating a reference acoustic signal on the window as the window closes; and wherein the control circuit, in comparing, is further operative to compare the sensed acoustic signals with a predetermined reflected acoustic pattern associated with the reference acoustic signal in the absence of an object in the path of the closing window.

3. The system as recited in claim 1 wherein the control circuit is further operative to control the power window system upon detecting the object.

4. The system as recited in claim 3 wherein the control circuit, in controlling the power window, is further operative to control the motor to stop.

5. The system as recited in claim 3 wherein the control circuit, in controlling the power window, is further operative to control the motor to reverse direction.

6. A system for detecting an object caught in the path of a vehicle power window system having a window that opens and closes via a motor commanded by a control circuit, the system comprising:

an acoustic sensor for sensing acoustic signals associated with the window as the window closes;

a control circuit having control logic for comparing the sensed acoustic signal with a predetermined noise threshold and detecting an object caught in the path of the vehicle power window system based on the comparison, wherein the acoustic sensor is further operative to sense a current acoustic signal as the window closes during a current window closing operation, wherein the control circuit, in comparing, is further operative to compare the sensed current acoustic signal with a previously sensed acoustic signal during the window closing operation and determine if the sensed current acoustic signal differs from a previously sensed acoustic signal wherein the control circuit, in comparing the sensed current acoustic signal with a previously sensed acoustic signal, is further operative to compare the sensed current acoustic signal with a previously sensed acoustic signal for a predetermined amount of time after the end of the current window closing operation.

7. A method for detecting an object caught in the path of a vehicle power window system having a window that opens and closes via a motor commanded by a control circuit, the method comprising:

sensing acoustic signals associated with the window as the window closes;

comparing the sensed acoustic signals with a predetermined noise threshold;

detecting an object caught in the path of the vehicle power window system based upon the comparison; and wherein comparing comprises sensing a current acoustic signal as the window closes during a current window closing operation indicative of the sound associated with the window closing, comparing the sensed current acoustic signal with a previously sensed acoustic signal during the current window closing operation, and determining if the sensed current acoustic signal differs from the previously sensed acoustic signal.

8. The method as recited in claim 7, further comprising:

also generating a reference acoustic signal on the window as the window closes; and wherein comparing comprises comparing the sensed acoustic signals with a predetermined reflected acoustic pattern associated with the reference acoustic signal in the absence of an object in the path of the closing window.

9. The method as recited in claim 7 further comprising controlling the power window system upon detecting the object.

10. The method as recited in claim 9 wherein controlling the power window system includes controlling the motor to stop.

11. The method as recited in claim 9 wherein controlling the power window system includes controlling the motor to reverse direction.

12. A method for detecting an object caught in the path of a vehicle power window system having a window that opens and closes via a motor commanded by a control circuit, the method comprising:

sensing a current acoustic signal as the window closes during a current window closing operation;

comparing the sensed current acoustic signal with a previously sensed acoustic signal during the current window closing operation; and determining if the sensed current acoustic signal differs from the previously sensed acoustic signal, wherein comparing the sensed current acoustic signal with a previously sensed acoustic signal further comprises comparing the sensed current acoustic signal with a previously sensed acoustic signal for a predetermined amount of time after the end of the current window closing operation.

\* \* \* \* \*

UNITED STATES PATENT AND TRADEMARK OFFICE
CERTIFICATE OF CORRECTION

PATENT NO.     : 6,388,406 B1                                    Page 1 of 1
DATED          : May 14, 2002
INVENTOR(S)    : Christos Kyrtsos It is certified that error appears in the above-identified patent and that said Letters Patent is hereby corrected as shown below:

<u>Title page,</u>
Item [73], should read as follows:
-- [73] Assignee: Meritor Light Vehicle Systems, Inc.
               Troy, MI (US) --

Signed and Sealed this

Fifteenth Day of October, 2002

*Attest:*

*Attesting Officer*

JAMES E. ROGAN
*Director of the United States Patent and Trademark Office*